W. H. ROWE.
Hood for Vehicles.

No. 165,125.   Patented June 29, 1875.

WITNESSES
W. E. Chaffee
Harry Coleman

INVENTOR
Wm. H. Rowe

UNITED STATES PATENT OFFICE.

WILLIAM H. ROWE, OF WASHINGTON, DISTRICT OF COLUMBIA, ASSIGNOR OF ONE-HALF HIS RIGHT TO QUINTON CORWINE, OF SAME PLACE.

IMPROVEMENT IN HOODS FOR VEHICLES.

Specification forming part of Letters Patent No. 165,125, dated June 29, 1875; application filed June 9, 1875.

*To all whom it may concern:*

Be it known that I, WILLIAM H. ROWE, of Washington city, District of Columbia, have invented certain new and useful Improvements in Hoods for Vehicles, of which the following is a specification:

The invention consists in forming the hood of two sections, and combining them in such manner that one may be held in an upright position directly above the seat of the vehicle, while the other is pivoted so that it may be thrown either to the front or to the rear or alongside, one above the other, of the upright section, in order that the driver or occupant may be shielded from the sun or rain, whether coming from the back or front of the vehicle, and both placed directly over the driver or occupant, so as to give free vent and passage to the air. The upright section may be pivoted also, so that both sections may be thrown back behind the seat when desired.

Figure 1:
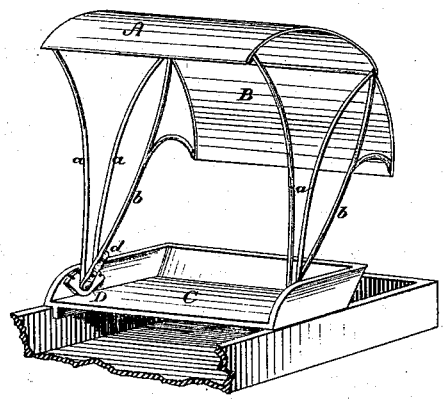
Figure 2:
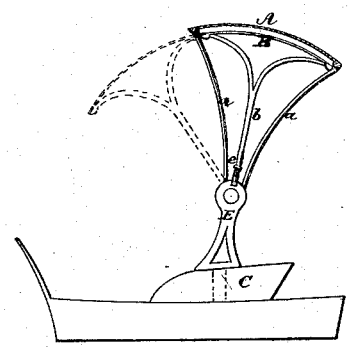
Figure 3:
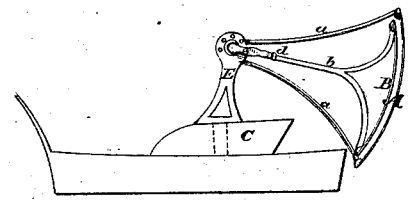

In the accompanying drawings, Figure 1 is a perspective view of a hood as applied to a light wagon, with the adjustable section placed back of the driver's seat. Fig. 2 is a side elevation of the device, with the sections placed one above the other, and showing by dotted lines the adjustable section placed in front of the seat. Fig. 3 is a side elevation, having both sections thrown back behind the seat.

In carrying out my invention I have shown in Fig. 1 the frame $a$ of the section A of the hood securely fixed to the seat $c$ of the vehicle, and the frame of the section B hinged thereto, so that it may be thrown to the front or back of the seat, and held in any desired position by means of a locking device, $d$, that engages with notches in a semicircular plate, D, affixed to the seat or to the frame $a$ of the hood section A.

In Figs. 2 and 3 the framing of sections A and B of the hood are pivoted to standards E E attached to the ends of the seat $c$ in such manner that both sections may be dropped behind the seat when desired, the section A being held in its upright position by a bolt, $e$, engaging in a notch in the standards. The standards may be held by bolts passing through loops or mortises in the seat or body of the vehicle, as shown in the drawings, so that the entire hood arrangement may be removed or replaced.

The device may be readily applied to open vehicles not constructed or provided with hood arrangements. When both sections are held in the upright position, but little obstruction is given to the free passage and circulation of the air, thus enabling it to be made light and durable in appearance and finish.

I claim as my invention, and desire to secure by Letters Patent—

1. A hood for vehicles formed of two independent sections, one of said sections being hinged and arranged to be thrown to the front or rear of the other section, substantially as described.

2. The hood, formed of two separate sections, arranged as above described, and hinged to the body or seat of the vehicle, so that both sections may be thrown back of the seat, substantially as and for the purpose set forth.

WM. H. ROWE.

Witnesses:
W. T. HUTCHINSON,
HARRY C. BIRCH.